United States Patent
Augustine et al.

(10) Patent No.: US 11,027,767 B2
(45) Date of Patent: Jun. 8, 2021

(54) STEERING SYSTEM RACK WITH STEPPED PORTION

(71) Applicant: Steering Solutions IP Holding Corporation, Saginaw, MI (US)

(72) Inventors: Michael J. Augustine, Mayville, MI (US); Kevin P. Douglas, Bay City, MI (US); Gary V. Weiss, Saginaw, MI (US); William H. Georges, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 258 days.

(21) Appl. No.: 16/206,343

(22) Filed: Nov. 30, 2018

(65) Prior Publication Data
US 2020/0172152 A1 Jun. 4, 2020

(51) Int. Cl.
*B62D 3/12* (2006.01)
*B21K 1/76* (2006.01)
*B62D 5/04* (2006.01)

(52) U.S. Cl.
CPC .............. *B62D 3/126* (2013.01); *B21K 1/767* (2013.01); *B62D 5/0448* (2013.01)

(58) Field of Classification Search
CPC .......... F16H 19/04; B62D 3/126; B21K 1/767
See application file for complete search history.

(56) References Cited

U.S. PATENT DOCUMENTS

| | | | | |
|---|---|---|---|---|
| 4,559,843 A * | 12/1985 | Nilsson | .................... | F16H 19/04 |
| | | | | 251/250 |
| 7,207,231 B2 * | 4/2007 | Saarinen | ................... | B21H 1/10 |
| | | | | 29/893.34 |
| 7,654,165 B2 * | 2/2010 | Roeske | ................... | B62D 3/126 |
| | | | | 74/388 PS |
| 8,397,597 B2 * | 3/2013 | Tanabe | .................... | F16H 55/26 |
| | | | | 74/422 |
| 8,770,054 B2 * | 7/2014 | Yamakawa | ............ | B21K 1/767 |
| | | | | 74/422 |
| 10,060,518 B2 * | 8/2018 | Nomura | ................... | F16H 55/26 |
| 2014/0020493 A1 * | 1/2014 | Nakamura | .............. | F16H 19/04 |
| | | | | 74/422 |
| 2015/0000135 A1 * | 1/2015 | Oumi | ..................... | B62D 3/126 |
| | | | | 29/893.34 |
| 2017/0008551 A1 * | 1/2017 | Mizushima | ............. | F16H 55/26 |
| 2017/0225703 A1 * | 8/2017 | Oikawa | ................... | F16H 55/26 |
| 2017/0267277 A1 * | 9/2017 | Ohashi | ...................... | B62D 3/12 |
| 2017/0297608 A1 * | 10/2017 | Span | ........................ | B62D 3/12 |
| 2017/0363121 A1 * | 12/2017 | Lee | ........................ | F15B 15/065 |
| 2020/0047792 A1 * | 2/2020 | Washnock | ............. | B62D 3/123 |
| 2020/0262470 A1 * | 8/2020 | Kondo | .................... | F16H 19/04 |

FOREIGN PATENT DOCUMENTS

JP 2019076905 A * 5/2019 ............. B21K 1/768

* cited by examiner

*Primary Examiner* — David M Fenstermacher
(74) *Attorney, Agent, or Firm* — Dickinson Wright PLLC

(57) ABSTRACT

A rack bar blank for a steering system includes a first region having a first diameter. The rack bar blank also includes a second region having a second diameter that is greater than the first diameter prior to formation of teeth on the second region and a ball screw thread on the first region.

10 Claims, 4 Drawing Sheets

STEERING SYSTEM RACK WITH STEPPED PORTION

BACKGROUND

The embodiments described herein relate to vehicle steering systems and, more particularly, to a rack blank with a stepped diameter for vehicle steering systems.

Steering systems that employ a ball screw to convert rotary steering assist power into a linear output, which may be referred to as rack assist electric power steering (REPS), require that the rotary motion of the ball screw be constrained to generate axial motion of the same. Two common approaches are used in the automotive industry to accomplish this. First, a steering pinion, engaged with a toothed portion of a cylindrical mating rack that is directly coupled to the ball screw, provides not only mechanical feedback to the steering system, but also 100% of the ball-screw torque reaction. Second, a non-cylindrical section mating rack with two symmetric flats added to its section, which is directly coupled to the ball screw, provides partial ball-screw torque reaction when interfaced with a complementary shaped plunger (e.g., rack shoe). The rack flats are oriented to be substantially non-orthogonal to the plunger motion direction. The pinion provides the needed additional torque reaction. Tie rod orientation that generates reaction forces that are substantially normal to the rack shoe increase the pinion reaction in the system.

In these systems, ball screw torque results in highly localized contact in the rack and pinion mesh. As assist levels (ball-nut torque) increase in such systems, the contact stresses associated with the localized contact can exceed the material capacity, resulting in high wear and reduced durability at the rack and pinion mesh location.

SUMMARY

According to one aspect of the disclosure, a rack bar blank for a steering system includes a first region having a first diameter. The rack bar blank also includes a second region having a second diameter that is greater than the first diameter prior to formation of teeth on the second region and a ball screw thread on the first region.

According to another aspect of the disclosure, a method of forming a rack bar for a steering system is provided. The method includes modifying a single, integrally formed circular rack bar blank to provide a ball screw region having a first diameter along a first length of the rack bar blank and a pinion mesh region having a second diameter along a second length of the rack bar blank, the second diameter being greater than the first diameter. The method also includes cutting a plurality of teeth along and into the pinion mesh region after the first and second diameters have been formed. The method further includes forming a ball screw thread into the ball screw region after the first and second diameters have been formed.

According to yet another aspect of the disclosure, a method of forming a rack bar for a steering system includes joining a first circular rack bar blank portion to a second circular rack bar blank portion, the first circular rack blank portion having a first diameter and the second circular rack bar blank portion having a second diameter, the second diameter being greater than the first diameter.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
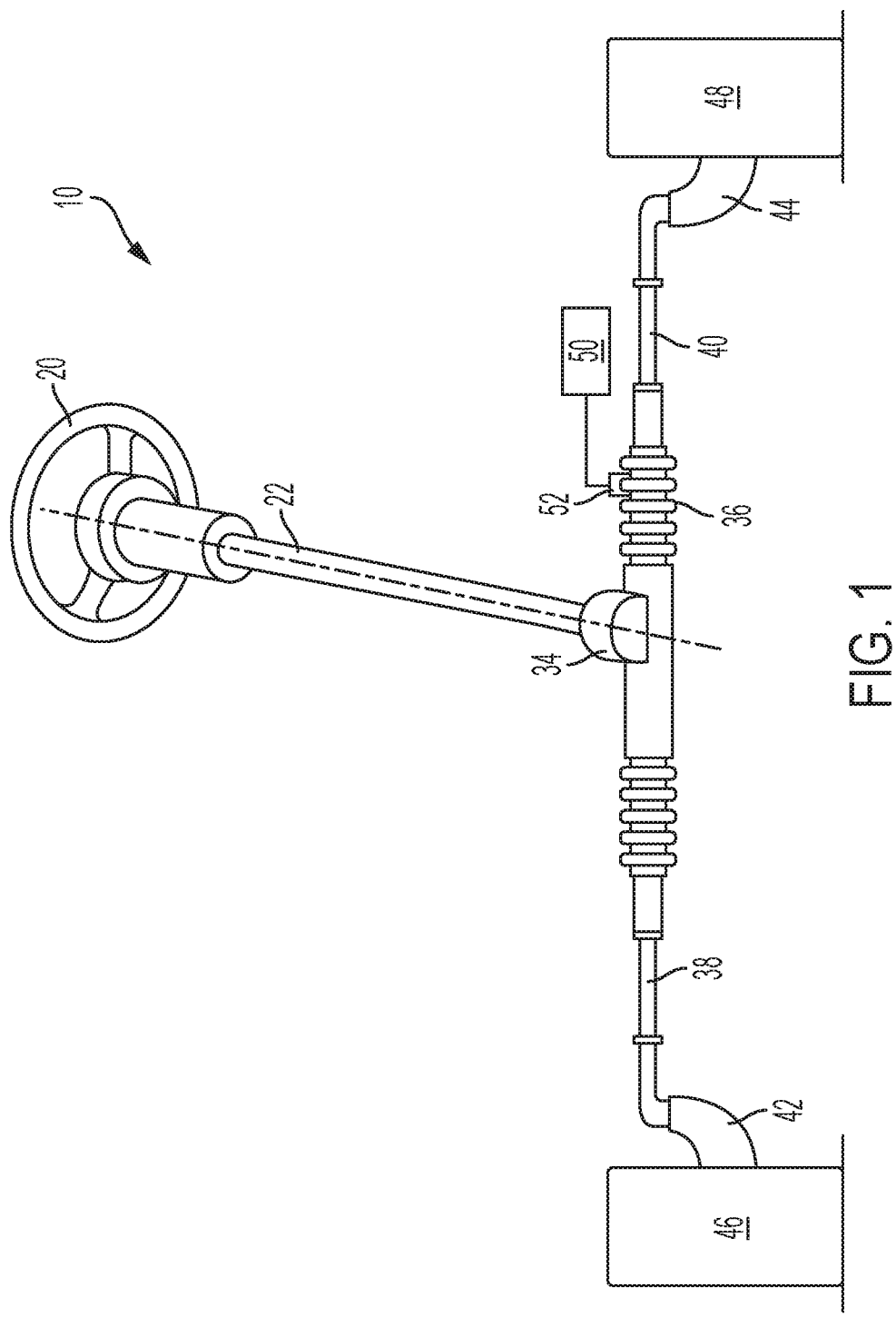
FIG. 1 is a perspective view of a vehicle steering system.

Referring now to the Figures, where the invention will be described with reference to specific embodiments, without limiting same, FIG. 1 illustrates a vehicle steering system 10 that is provided to steer a vehicle in a desired direction. The steering system 10 may include a hand wheel 20 operatively connected to a gear housing 34 via a steering column 22. The steering column 22 may be formed with one or more column sections, such as an upper column and a lower column, for example, but it is to be appreciated that various numbers of column sections may be employed. Also included is a steering mechanism 36, tie rods 38, 40, steering knuckles 42, 44, and road wheels 46, 48.

The steering system 10 is an electric power steering system that utilizes a rack and pinion steering mechanism, which includes a toothed rack bar 36 and a pinion gear (not shown) located under gear housing 34. During operation, as hand wheel 20 is turned by a vehicle operator, the steering column 22 turns the pinion gear. Rotation of the pinion gear moves the toothed rack bar 36, which moves tie rods 38, 40. Tie rods 38, 40 in turn move respective steering knuckles 42, 44, which turn the respective road wheels 46, 48. It is to be appreciated that the steering system 10 may include fewer or more shaft or column components. Furthermore, as described above, in some embodiments a physical connection is not provided between the hand wheel 20 (or other steering input device) and a lower/forward portion of the steering column 22.

The steering system 10 includes a power steering assist assembly that assists steering effort with a motor 50 that drives a ball-screw assembly. In particular, a nut 52 is engaged with a ball screw portion of the rack bar 36 to assist with translation of the rack bar 36.

Figure 2:
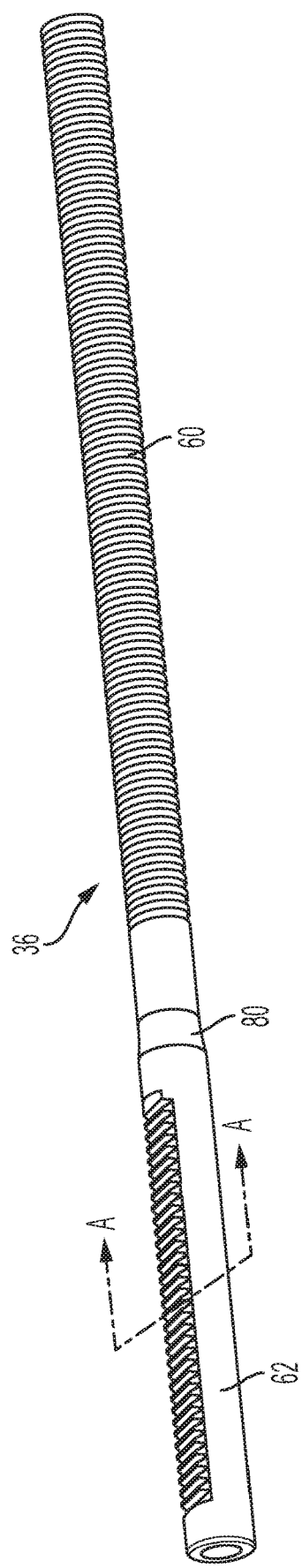
FIG. 2 is a perspective view of a rack bar of the vehicle steering system.

Referring now to FIG. 2, a blank of the rack bar 36 is illustrated to show the rack bar 36 prior to inclusion of some of the teeth of the rack bar 36. The blank of the rack bar 36 includes a ball screw region 60 along a length thereof and a discrete pinion mesh region 62 along a length thereof. The ball screw region 60 is a region of the rack bar 36 that will include a ball screw thread form that is kinematically engaged with the nut 52 through a series balls in a recirculating ball circuit for powered steering assist. The pinion mesh region 62 is a region of the rack bar 36 that includes teeth that are configured to be in meshed engagement with the pinion of the rack and pinion mechanism.

The rack bar 36 is formed of two different diameter portions, thereby forming a stepped diameter bar. The pinion mesh region 62 of the blank has a diameter that is greater than the diameter of the ball screw region 60. It is to be appreciated that the transition from the smaller diameter portion of the rack bar 36 may be abrupt in the form of a literal step (or substantially close thereto). In other words, a substantially perpendicular wall may be formed joining the smaller diameter portion to the larger diameter portion. Alternatively, the transition may be a gradual transition in the form of a ramp, for example. The angle and length of the ramp may vary depending upon the particular application of use. The illustrated ramped transition region 80 is merely an example of the transition between the different diameter regions.

Figure 3:
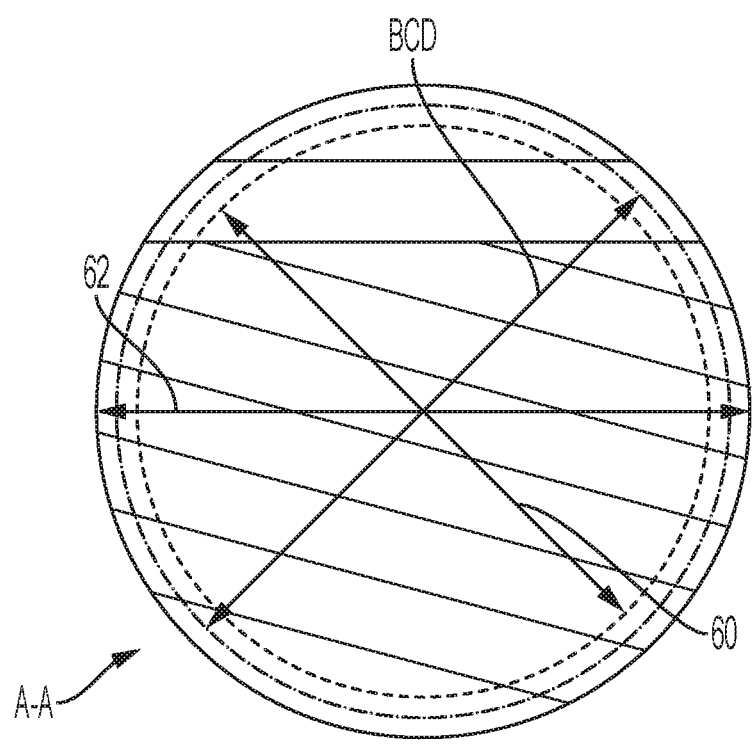
FIG. 3 is a sectional view of the rack bar taken along line A-A of FIG. 2.

FIG. 3 illustrates a cross-sectional view of the rack bar 36. As the balls operate in the ball circuit, the radial position of their centers is maintained at a ball circle diameter (BCD) with respect to the axis of rotation by the thread forms of the ball screw and ball nut. The radial extent of the pinion mesh region 62 will increase relative to the rotation center in relation to the BCD such that the maximum radial extent is always greater than the outer diameter of the ball screw zone 60 before the BCD is established by rolling or grinding of the ball screw thread form.

Figure 4:
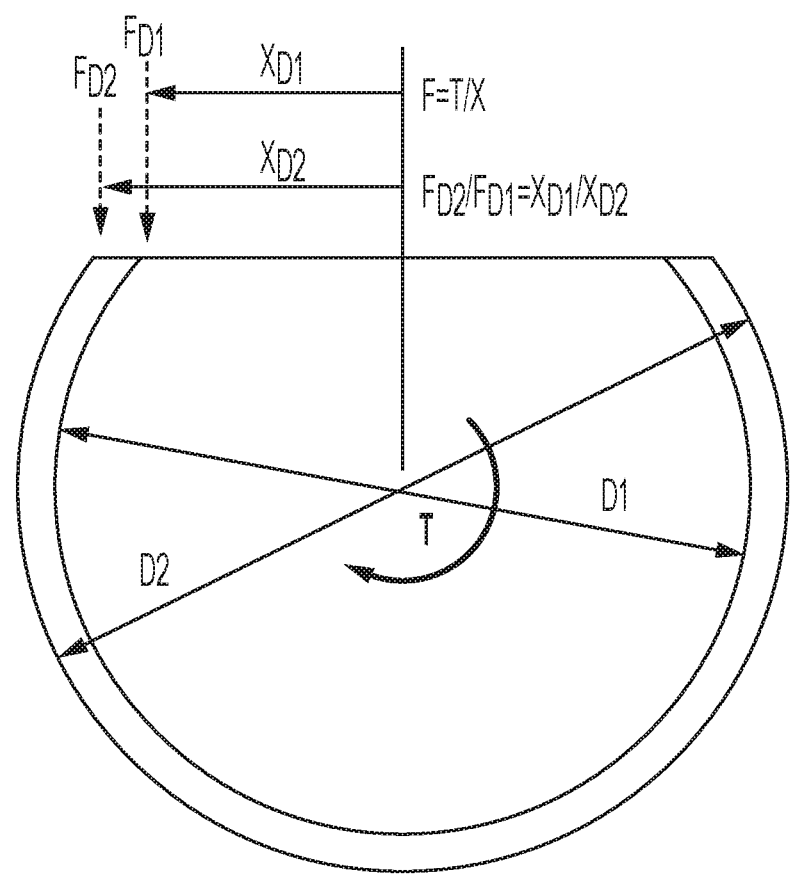
FIG. 4 is an end view of the rack bar.

Referring now to FIG. 4, the relationship between the forces associated with a torque on the two different diameter rack bars is shown. As shown, the smaller bar has a diameter D1 and the larger bar has a diameter D2. Upon application of a torque T, the resultant force at points on the outer diameter of each region is illustrated. In particular, a reaction force for the D1 diameter bar is $T/X_{D1}$. Similarly, the resultant reaction force for the D2 diameter bar is $T/X_{D2}$.

By providing a larger diameter pinion mesh region 62, the effective face width of the rack teeth are substantially increased when compared to a standard single diameter rack bar. Increasing the effective face width of the rack teeth increases the reaction torque capability of each tooth end by lowering the mating pinion's local ball-nut torque reaction force. This torque reaction force is reduced in proportion to the increased face width, thereby lowering the individual reactive loads and reducing the potential for pinion and rack tooth wear or fatigue damage. Therefore, the tooth end of the rack bar's shape increases torque reaction capability in proportion to the top width.

A method of forming the rack bar 36 includes machining or forming processes that reduce the diameter of a portion of the rack bar 36 to provide the smaller diameter ball screw region 60. The rack bar 36 may be formed with a single, integrally formed rack bar blank in some embodiments. In other embodiments, the two regions—ball screw region 60 and pinion mesh region 62—of the rack bar 36 may be separately formed and coupled in any suitable manner.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A rack bar blank for a steering system, the rack bar blank comprising:
   a first region having a first diameter;
   a second region having a second diameter that is greater than the first diameter prior to formation of teeth on the second region and a ball screw thread on the first region; and
   a transition region along an outer surface of the rack bar blank, the transition region extending radially outwardly in a direction from the first region to the second region, the transition region joining the first region and the second region.

2. The rack bar blank of claim 1, wherein the first region is a ball screw region engageable with a ball screw nut upon formation of a ball screw thread form thereon, the second region engageable with a pinion upon formation of teeth thereon.

3. The rack bar blank of claim 1, wherein the rack bar blank is a single, integrally formed component.

4. The rack bar blank of claim 1, wherein the rack bar blank comprises a plurality of components joined together.

5. The rack bar blank of claim 1, wherein the transition region is an angled ramp.

6. The rack bar blank of claim 1, wherein the transition region is a perpendicular step.

7. The rack bar blank of claim 1, wherein at least a portion of the transition region is curved.

8. A method of forming a rack bar for a steering system comprising:
   modifying a single, integrally formed circular rack bar blank to provide a ball screw region having a first diameter along a first length of the rack bar blank and pinion mesh region having a second diameter along a second length of the rack bar blank, the second diameter being greater than the first diameter;
   cutting a plurality of teeth along and into the pinion mesh region after the first and second diameters have been formed;
   forming a ball screw thread into the ball screw region after the first and second diameters have been formed; and
   modifying the rack bar blank to include a transition region extending between the pinion mesh region and the ball screw region, the transition region extending radially outwardly in a direction from the first region to the second region.

9. The method of claim 8, wherein modifying the rack bar blank comprises a machining process.

10. The method of claim 8, wherein modifying the rack bar blank comprises a forming process.

* * * * *